A. V. WILLIAMS.
BOILER GAGE CONNECTION.
APPLICATION FILED SEPT. 20, 1911.
1,025,354.
Patented May 7, 1912.
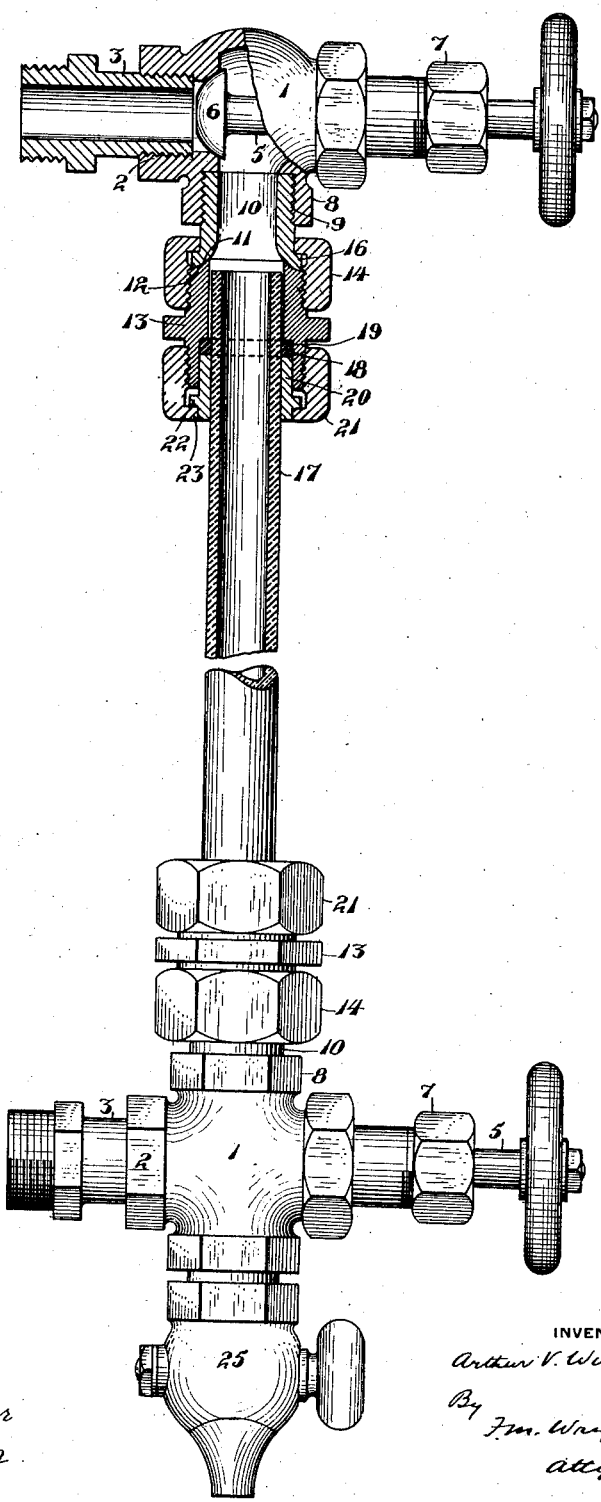
WITNESSES
INVENTOR

UNITED STATES PATENT OFFICE.

ARTHUR V. WILLIAMS, OF SAN FRANCISCO, CALIFORNIA.

BOILER-GAGE CONNECTION.

1,025,354.　　　　　Specification of Letters Patent.　　　Patented May 7, 1912.

Application filed September 20, 1911. Serial No. 650,347.

*To all whom it may concern:*

Be it known that I, ARTHUR V. WILLIAMS, a citizen of the United States, residing at San Francisco, in the county of San Francisco and State of California, have invented new and useful Improvements in Boiler-Gage Connections, of which the following is a specification.

The present invention relates to an improved connection for water gages, especially adapted for boilers, the object of the invention being to provide such a connection, which, in case of breakage of the gage, can be replaced very rapidly, and which will also be free from the defects of present gage connections.

In the accompanying drawing, the figure is a broken side view of a gage showing the connections with the boiler, the upper connection being shown partly in section.

For brevity of description I will first describe the upper gage connection, the construction of the lower connection being, with slight exceptions, the same as of the upper.
Referring to the drawing, 1 indicates a valve casing having a threaded end 2, in which is screwed a short tube 3, which is screwed into the shell of the boiler, not shown. Through the other end of said casing passes the stem 5 of a valve 6, having a suitable stuffing gland 7. Into a depending central member 8 of the valve casing is screwed, as shown at 9, a tubular union 10, the lower end of which is formed, around the aperture therethrough, with a receding ground face 11, within which fits a conical ground face 12 of the upper end of a gage glass holder 13. These faces 11, 12, are ground so that they can make with each other a steam tight joint. The holder is secured to said member 8 by a coupling nut 14 screwed to the holder, and surrounding said member and having an inwardly extending flange engaging an outwardly extending flange 16 on the member 8. The inner surface of the holder is accurately bored so as to permit about $\frac{1}{32}$ of an inch clearance between said inner surface and the outer surface of the gage tube 17, which is passed therethrough. Said holder is formed in its lower portion with a stuffing box 18, within which is received a packing ring 19 around the gage tube. Against said ring is pressed a gland 20 which is contained within a coupling nut 21 which is screwed on the threaded lower end of the holder, the gland 20 being formed with an outwardly extending flange 22 which is engaged by an inwardly extending flange 23 of the coupling nut 21 and thus compresses said packing ring between said gland 20 and the lower end of the holder around the gage tube. The lower connection differs from the upper only in that the member 8 extends upwardly instead of downwardly and in being provided with a drain cock 25.

The following are the advantages of my improved gage connection. With gage connections at present in use, so far as my knowledge extends, it is necessary to cut the glass tube to correspond in length with the distance between the connections, and to form a tight packing at the top and bottom of the gage tube by passing packing rings around said top and bottom and compressing each ring around said gage tube by a nut gland screwed into the valved connection, or into a part immediately connected therewith. The disadvantages of this construction are, that it is difficult to get the correct measurement and to cut the gage glass accurately to the length required on account of the fact that the engineer is compelled to work in a cramped space at a high temperature, and is constantly liable to injury from steam escaping from the boiler. In addition, the packing of the connection takes considerable time, since with the old construction a special form of packing is necessary.

With my improved construction the packing on the gage glass is already prepared, and no work close to the boiler is needed to pack said glass tube, but the glass tube having the packings in position thereon, can be brought into position between the upper and lower connections, and secured in place merely by screwing the two nuts on the upper and lower holders respectively, which operation occupies only about a minute's time. Moreover it is not necessary to cut the gage glass so accurately to the proper length as heretofore, as it is evident that the length of the glass may vary very considerably without affecting its operation or the effectiveness of the packing therefor. The present invention is therefore an improvement upon prior forms of gage connections, first, because it enables the gage glass to be replaced by inexperienced persons instead of requiring an engineer for that purpose; second, because the operation of replacing it is reduced to the short period of one or two minutes from a period of one-half an hour to an hour; third, because no special degree of accuracy is required in cutting off the glass tube to the proper length, and therefore there is much less waste of gage glasses by reason of their having to be discarded as being of improper length; fourth, there is much less danger of the gage glass bursting, since its ends do not now touch the metallic parts of the valve connections; fifth, the packing ring may be of a much cheaper quality than that heretofore used, while equally effective; sixth, the packing rings are much less likely to blow out than heretofore.

I claim:—

1. In combination with a gage tube and a valve casing adapted to be connected to a boiler, a tubular element secured to said valve casing, packing surrounding the gage tube, a holder for said packing slidable on said tube, and means for compressing said packing around the gage tube, said element and holder being provided with means for making a steam tight joint therebetween.

2. In combination with a gage tube and a valve casing adapted to be connected to a boiler, a tubular element secured to said valve casing, packing surrounding the gage tube, a holder for said packing slidable on said tube, and means for compressing said packing around the gage tube, said element and holder having respectively ground faces adapted to contact with each other and being provided with means for pressing said ground faces together.

In testimony whereof I have hereunto set my hand in the presence of two subscribing witnesses.

ARTHUR V. WILLIAMS.

Witnesses:
 FRANCIS M. WRIGHT,
 D. B. RICHARDS.

---

Copies of this patent may be obtained for five cents each, by addressing the "Commissioner of Patents Washington, D. C."